United States Patent
Boada-Bauxell et al.

(10) Patent No.: US 9,939,818 B2
(45) Date of Patent: Apr. 10, 2018

(54) METHOD AND SYSTEM FOR AUTOMATIC AUTONOMOUS LANDING OF AN AIRCRAFT

(71) Applicant: Airbus Operations (S.A.S.), Toulouse (FR)

(72) Inventors: Josep Boada-Bauxell, Toulouse (FR); Victor Gibert, Lanta (FR); Laurent Burlion, Toulouse (FR); Abdelhamid Chriette, Nantes (FR); Franck Plestan, Muzillac (FR)

(73) Assignee: Airbus Operations (S.A.S.), Toulouse (FR)

( * ) Notice: Subject to any disclaimer, the term of this patent is extended or adjusted under 35 U.S.C. 154(b) by 228 days.

(21) Appl. No.: 14/808,646

(22) Filed: Jul. 24, 2015

(65) Prior Publication Data

US 2016/0026189 A1    Jan. 28, 2016

(30) Foreign Application Priority Data

Jul. 25, 2014   (FR) ...................................... 14 57208

(51) Int. Cl.
  *G05D 1/06*    (2006.01)
  *G06K 9/52*    (2006.01)
  (Continued)

(52) U.S. Cl.
  CPC ............. *G05D 1/0676* (2013.01); *G06K 9/52* (2013.01); *G06T 7/60* (2013.01); *G06T 7/73* (2017.01); *H04N 7/18* (2013.01)

(58) Field of Classification Search
  None
  See application file for complete search history.

(56) References Cited

U.S. PATENT DOCUMENTS 6,111,526 A  *  8/2000  Aymeric .............. G01C 23/005
                                                244/181
6,952,632 B2    10/2005  Robert et al.
(Continued)

FOREIGN PATENT DOCUMENTS

CN      101 109 640 A      1/2008
EP      1 335 258 A1       8/2003
(Continued)

OTHER PUBLICATIONS

Farineau, J., "Lateral electric flight control laws of the A320 based upon eigenstructure assignment techniques," In Proc. AIAA Conference on Guidance, Navigation and Control, 1989 , pp. 1367-1372, American Institute of Aeronautics and Astronautics, Boston, USA.

(Continued)

*Primary Examiner* — Frederick D Bailey
(74) *Attorney, Agent, or Firm* — Jenkins, Wilson, Taylor & Hunt, P.A.

(57)  ABSTRACT

A system for automatic landing of an aircraft on a runway, including an onboard image capture system, image analyzer for detecting in an image a landing runway and determining characteristics of a segment connecting a planned point of impact on the runway and a vanishing point of the image, a measurement module for measuring observables in an inertial frame tied to the runway, on the basis of characteristics of the segment, the observables including a first observable, a second observable, and a third observable, an estimator for estimating longitudinal, lateral and vertical position deviations of aircraft position relative to point of impact from measurements of the first, second and third observables, and guidance for determining aircraft guidance orders from the longitudinal, lateral and vertical deviations and of the relative heading angle.

11 Claims, 6 Drawing Sheets

(51) Int. Cl.
*G06T 7/60* (2017.01)
*H04N 7/18* (2006.01)
*G06T 7/00* (2017.01)
*G06T 7/73* (2017.01)

(56) References Cited

U.S. PATENT DOCUMENTS

| | | | |
|---|---|---|---|
| 9,260,180 B2 | 2/2016 | Puyou et al. | |
| 2002/0002428 A1* | 1/2002 | Kubica | B64C 13/18 701/11 |
| 2003/0225487 A1 | 12/2003 | Robert et al. | |
| 2004/0225420 A1* | 11/2004 | Morizet | G01C 23/005 701/3 |
| 2005/0075761 A1 | 4/2005 | Kubica | |
| 2005/0125142 A1 | 6/2005 | Yamane | |
| 2007/0247336 A1* | 10/2007 | Morizet | G01C 23/00 340/945 |
| 2008/0071431 A1 | 3/2008 | Dockter et al. | |
| 2010/0057278 A1* | 3/2010 | Lee | G05D 1/0676 701/16 |
| 2015/0032299 A1 | 1/2015 | Puyou et al. | |

FOREIGN PATENT DOCUMENTS

| | | |
|---|---|---|
| FR | 2 735 445 A1 | 12/1996 |
| FR | 2835314 A1 | 8/2003 |
| GB | 2302318 A | 1/1997 |
| WO | WO 2014/075657 | 5/2014 |

OTHER PUBLICATIONS

DAHL, O. et al., "Linear design of a nonlinear observer for perspective systems," Proceedings of the 2005 IEEE International Conference on Robotics and Automation, Apr. 18-22, 2005, pp. 429-435, IEEE.

Karagiannis, D. et al., "A new solution to the problem of range identification in perspective vision systems," IEEE Transactions on Automatic Control, Dec. 2005, pp. 2074-2077, vol. 50, No. 12, IEEE.

Le Bras, Florent et al., "Approach Maneuvers for Autonomous Langing Using Visual Servo Control," IEEE Transactions on Aerospace and Electronic Systems, Apr. 2014, p. 1051-1065, vol. 50, No. 2, IEEE.

Miller, A. et al., "Landing a UAV on a runway using image registration," IEEE International Conference on Robotics and Automation, 2008, pp. 182-187, IEEE, Pasadena, CA, USA.

French Search Report for Application No. 13 57288 dated Apr. 11, 2014.

Non-Final Office Action for U.S. Appl. No. 14/339,220 dated May 8, 2015.

French Search Report for Application No. 14 57208 dated Jun. 1, 2015.

Interview Summary for U.S. Appl. No. 14/339,220 dated Jul. 24, 2015.

Notice of Allowance for U.S. Appl. No. 14/339,220 dated Oct. 13, 2015.

* cited by examiner

METHOD AND SYSTEM FOR AUTOMATIC AUTONOMOUS LANDING OF AN AIRCRAFT

CROSS-REFERENCE TO RELATED APPLICATION

This application claims priority to FR 14 57208 filed Jul. 25, 2014, the entire disclosure of which is incorporated by reference herein.

TECHNICAL FIELD

The present disclosure relates generally to the field of aeronautics and more particularly to that of automatic landing systems.

BACKGROUND

The landing phase is a critical phase of the flight of an aircraft since it is during this phase that incidents mostly occur. To ease the task of pilots, numerous automatic landing systems have been proposed. Known in particular is the instrument landing system or ILS fitted to large-capacity airliners and whose ground infrastructures are present in international airports. The MLS microwave landing system is also available in certain European airports. These systems use radio or microwave signals to guide the aircraft in its approach phase both laterally with respect to the axis of the runway and vertically with respect to the approach plane (glide path). However, they exhibit the drawback of not being available in all airports because in particular of their high costs and of exhibiting heavy constraints of use. Furthermore, the ground infrastructures exhibit a breakdown probability of the order of $10^{-3}$/hour. Aircraft may therefore not be certain of being able to perform a landing in automatic mode. Automatic landing systems, dubbed GLS (Ground based augmented system Landing System) or SLS (Satellite-based Landing System) which use satellite positioning, have appeared more recently. As current satellite positioning systems do not make it possible to obtain the precision required to perform a landing, they must be augmented with ground reference stations such as those of the WAAS (Wide Area Augmentation System) or EGNOS (European Geostationary Navigation Overlay Service) network. These systems are still not very widespread and exhibit a relatively low availability rate (of the order of 99.5%) which, once again, does not make it possible to permanently guarantee landing in automatic mode.

Because of the spatial and temporal unavailability of such ground infrastructures, interest has turned to autonomous landing systems, using video images of the ground, captured by an onboard camera.

These autonomous systems generally use the video images captured by the onboard camera and information relating to the runway to estimate the attitude and the position of the aircraft with respect to the runway. The aircraft guidance orders are thereafter computed on the basis of the position and attitude thus determined. However, this estimation is a complex operation, which generally requires the availability of an onboard digital model of the topography of the airport or at the very least of geometric and topographic information relating to the landing runway. Furthermore, when the database containing the digital model is unavailable or in case of emergency landing on an arbitrary field, the aforementioned autonomous systems are inoperative.

Application FR-A-2835314 filed by the present applicant proposes a landing aid system that does not make it necessary to know the characteristics of the landing runway. However, this system operates only when the aircraft is a few meters from the ground, according to a principle much like a driving aid in the road traffic context. In particular it does not make it possible to guide the aircraft throughout the final approach, that is to say during the last ten kilometers or so.

An object of the present disclosure is a system for automatic landing of an aircraft which is particularly robust, can operate in total or partial absence of information about the landing runway, and guide an aircraft in an autonomous manner throughout the final approach.

SUMMARY

The present disclosure relates to a system for automatic landing of an aircraft on a landing runway comprising:
- an onboard image capture system carried by the aircraft and intended to capture a series of successive images of the ground;
- an image analyzer for detecting in an image a landing runway and for determining in this image the characteristics of a segment [P,Ω] connecting a planned point of impact P on the runway and a vanishing point SI of the image.

The automatic landing system is advantageous in that it comprises:
- a measurement system or module for measuring a plurality of observables in an inertial frame tied to the runway, on the basis of the characteristics of the segment [P,Ω], the plurality of observables comprising a first observable defined by the relative heading angle (ψ) of the aircraft with respect to a mid-axis of the runway, a second observable $$\left(\frac{\Delta Y}{\Delta H}\right)$$

defined by the ratio of a lateral deviation of the position of the aircraft with respect to the point of impact and a third observable $$\left(\frac{\Delta X}{\Delta H}\right)$$

defined by the ratio of a longitudinal deviation to a vertical ratio of the position of the aircraft with respect to the point of impact;
- an estimator, which can be an estimation system or module, for estimating longitudinal (ΔX), lateral (ΔY) and vertical (ΔH) position deviations, expressed in the inertial frame, of the position of the aircraft with respect to the point of impact on the basis of the measurements of the first, second and third observables;
- a guidance system or module for computing or determining guidance orders for the aircraft on the basis of the longitudinal, lateral and vertical position deviations thus estimated, and of the relative heading angle.

The particular choice of the observables makes it possible to estimate in a particularly simple manner a state vector comprising the longitudinal, lateral and vertical position deviations, expressed in the inertial frame, of the aircraft with respect to the point of impact. These deviations can be utilized directly by the guidance.

Advantageously, the characteristics of the segment [P,Ω] in the image are the angle $\zeta$ between the straight line (PΩ) with the vertical of the image, the distance $d_y$ of the point P from a horizon line $D_h$ and the distance $d_F$ between the orthogonal projection, $P_h$, of the point P on the horizon line and the vanishing point Ω.

In a first embodiment, the image capture system comprises an onboard camera, and the relative heading angle $\psi$ is measured in the image by the measurement system by the relation or formula:

$$\psi = \arctan\left(\cos\theta \cdot \left(\frac{d_F}{f} - \tan\phi\tan\theta\right)\right)$$

where f is the focal length of the onboard camera, $\phi$ is a roll angle and $\theta$ is the trim angle of the aircraft.

In this same embodiment, the second observable can be measured in the image by the measurer by the relation:

$$\frac{\Delta Y}{\Delta H} = \frac{(\cos\phi\sin\psi\sin\theta - \sin\phi\sin\psi) - (\sin\varphi\sin\psi\sin\theta + \cos\phi\cos\psi)\tan\zeta}{\tan\zeta\sin\phi\cos\theta - \cos\phi\cos\theta}$$

Likewise, the third observable can be measured in the image by the measurement system by the relation:

$$\frac{\Delta X}{\Delta H} = \frac{\frac{f}{d_y} - \left((\sin\psi\cos^2\theta)\frac{\Delta Y}{\Delta H} + \cos\theta\sin\theta\right)}{\cos\psi\cos^2\theta}$$

The longitudinal, lateral and vertical position deviations of the position of the aircraft with respect to the point of impact are advantageously estimated by the estimator by a dynamic model using as state equation $\dot{u}(t)=v(t)$, where $u(t)=\Delta X, \Delta Y, \Delta H)^T$ is a vector comprising the longitudinal, lateral and vertical position deviations at the instant t, v(t) is the velocity vector of the aircraft in an inertial frame, and as observation equation $r(t)=g(u(t)) n(t)$, where r(t) is the vector of the third and second observables, and g is the function which to any vector $u(t)=\Delta X, \Delta Y, \Delta H)^T$ maps the vector $$g(u(t)) = \left(\frac{\Delta X}{\Delta H} \quad \frac{\Delta Y}{\Delta H}\right)^T,$$

n(t) is a measurement noise vector.

The aircraft guidance orders comprise for example a load factor setting and a roll rate setting, the guidance computing or determining the load factor setting through the relation:

$$Nz_c = K_z \widehat{\Delta Z} + K_{V_z} V_z$$

where $\Delta Z = -\Delta H$, $V_Z = (\widehat{\Delta Z})'$ is the vertical speed, and $K_z$, $K_{V_z}$ are predetermined constants, and the roll rate setting through the relation:

$$\dot{\phi}_c = K_Y \widehat{\Delta Y} + K_\psi \psi + K_\phi \phi$$

where $K_Y$, $K_\psi$ and $K_\phi$ are predetermined constants.

The landing system can furthermore comprise a flight controls computer suitable for computing or determining controls to be applied to the actuators of the control surfaces of the aircraft so as to satisfy the guidance orders.

In a second embodiment, the image analyzer furthermore determines the characteristics of at least one segment ([A, Ω]) from among the plurality of segments each connecting a vertex of the runway to the vanishing point Ω, the measurement system or module measures a plurality of additional observables in an inertial frame tied to the runway on the basis of the characteristics of the at least one segment, the plurality of additional observables comprising a first additional observable defined by the relative heading angle ($\psi_A$) of the aircraft with respect to a straight line passing through the vertex of the runway and the vanishing point, a second additional observable $$\left(\frac{\Delta Y_A}{\Delta Z_A}\right)$$

defined by the ratio of a lateral deviation of the position of the aircraft with respect to the vertex and a third additional observable $$\left(\frac{\Delta X_A}{\Delta Z_A}\right)$$

defined by the ratio of a longitudinal deviation to a vertical ratio of the position of the aircraft with respect to the vertex, the estimator, which can be an estimation system or module, then estimating additional longitudinal ($\Delta X_A$), lateral ($\Delta Y_A$) and vertical ($\Delta Z_A$) position deviations, expressed in the inertial frame, of the position of the aircraft with respect to the vertex of the runway on the basis of the measurements of the first, second and third additional observables, the automatic landing system furthermore comprising a consolidator, which can be a consolidation system or module, for fusing the estimations of the longitudinal, lateral and vertical position deviations with the estimations of the additional longitudinal, lateral and vertical position deviations with respect to the vertex of the runway and providing consolidated longitudinal, lateral and vertical deviations in position between the aircraft and the planned point of impact.

In the second embodiment, the guidance system or module computes or determines the aircraft guidance orders on the basis of the longitudinal, lateral and vertical position deviation estimations after they have been fused with the additional longitudinal, lateral and vertical position deviations.

The estimator can then also provide on the basis of the estimations of the additional longitudinal, lateral and vertical position deviations, an estimation of the length and/or of the slope of the landing runway.

Finally the present disclosure relates furthermore to a method of automatic landing of an aircraft on a landing runway, comprising:

capturing a series of successive images of the ground;

an image analysis for detecting in an image the presence of a landing runway and for determining in this image the characteristics of a segment [P,Ω] connecting a planned point of impact P on the runway and a vanishing point Ω of the image;

measuring a plurality of observables in an inertial frame tied to the runway on the basis of the characteristics of the segment [P,Ω], the plurality of observables comprising a first observable defined by the relative heading angle (ψ) of the aircraft with respect to a mid-axis of the runway, a second observable $$\left(\frac{\Delta Y}{\Delta H}\right)$$

defined by the ratio of a lateral deviation of the position of the aircraft with respect to the point of impact and a third observable $$\left(\frac{\Delta X}{\Delta H}\right)$$

defined by the ratio of a longitudinal deviation to a vertical ratio of the position of the aircraft with respect to the point of impact;
  estimating the longitudinal (ΔX), lateral (ΔY) and vertical (ΔH) position deviations, expressed in the inertial frame, of the position of the aircraft with respect to the point of impact on the basis of the measurements of the first, second and third observables;
  computing or determining guidance orders for the aircraft on the basis of the longitudinal, lateral and vertical position deviations thus estimated, and of the relative heading angle.

BRIEF DESCRIPTION OF THE DRAWINGS

Other characteristics and advantages of the disclosure herein will become apparent on reading a preferential embodiment of the disclosure herein in conjunction with the following figures.

DETAILED DESCRIPTION

An automatic landing system using the images captured by an onboard image capture system carried by an aircraft is considered below. This image capture system comprises one or more cameras. Automatic landing system includes hereinafter either a system allowing the aircraft to put down on the landing runway without pilot intervention (Automatic Landing System) or equally a system aiding the pilot (Aided Landing System) during landing. In particular, the pilot will at any moment be able to correct the controls generated by the automatic landing system as a function of visual indications.

An automatic landing system according to the disclosure herein makes it possible to guide or to assist the pilot throughout the final approach. It can operate as soon as a landing runway has been identified (conventional landing on an airport runway), for example by a processing of images or else designated by the pilot, in particular in case of emergency landing on an improvised runway.

Figure 1:
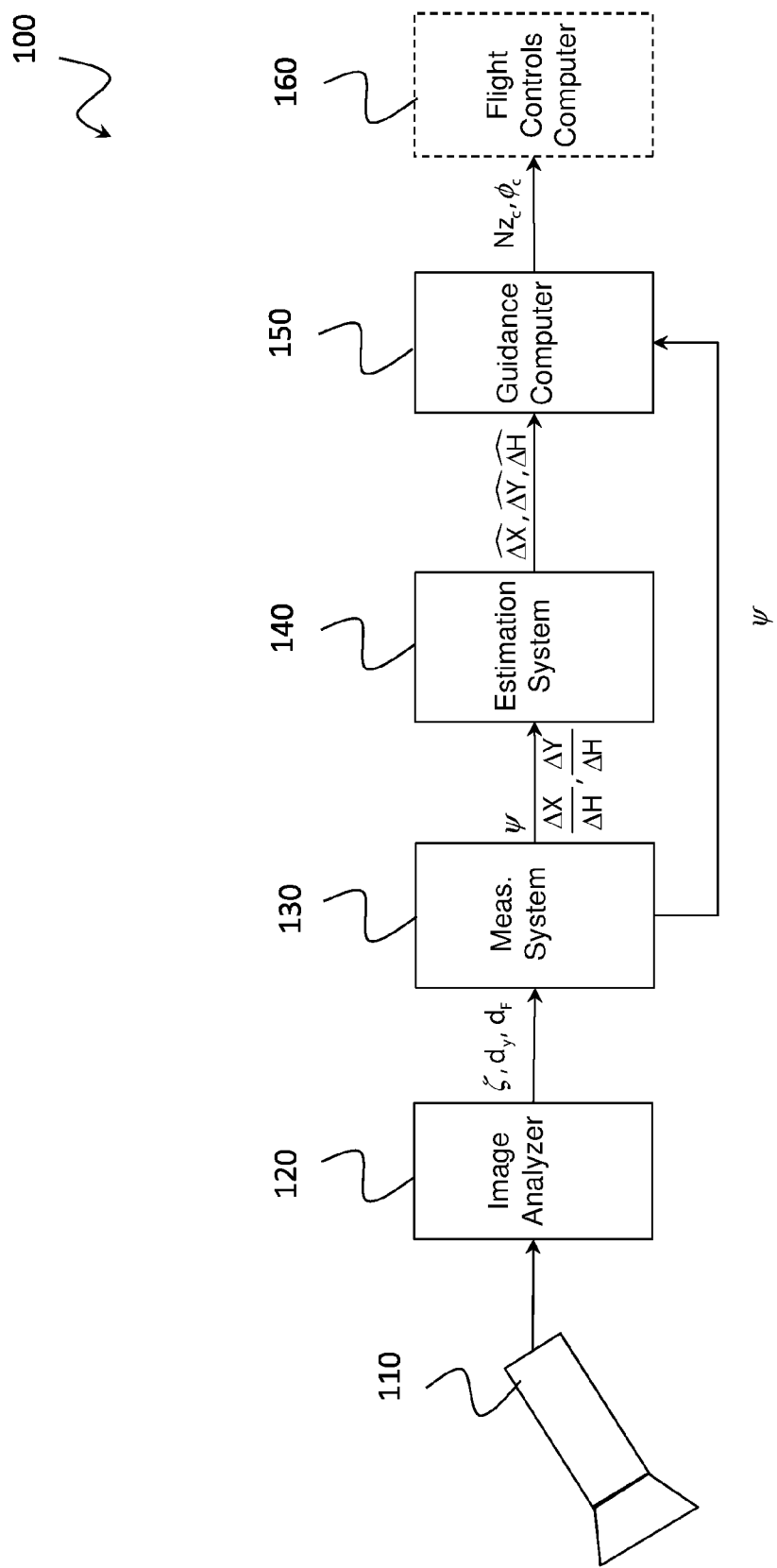
FIG. 1 represents in a schematic manner an automatic landing system according to a first embodiment of the disclosure herein.

FIG. 1 schematically represents an automatic landing system according to a first embodiment of the disclosure herein.

The automatic landing system, 100, comprises an image capture system, 110, for example an onboard camera, suitable for capturing successive images of the ground, and mounted in the vertical plane of symmetry of the aircraft.

This onboard camera may advantageously be a camera of an EVS (Enhanced Vision System) system fitted to most aircraft of recent construction. This system generally comprises a plurality of sensors (IR/visible cameras, millimetric radar, etc.) capable of providing the pilot with images of the ground under conditions of reduced visibility.

With no loss of generality, we will also assume hereinafter that the axis of the camera coincides with the longitudinal axis of the aircraft. Generally, the axis of the camera is situated in the vertical symmetry plane of the aircraft and may exhibit with the aforementioned longitudinal axis a known angular deviation $\theta_{cam}$, so that it is always possible to reduce to the previous assumption of zero angular deviation.

The intrinsic characteristics of the camera (in particular its focal length) are assumed known.

Image analyzer, 120, receives the successive images captured by the camera and process them to detect therein the presence of a landing runway. This detection can be carried out by the image processing scheme described in international application WO2014/075657. In a first step, the image processing scheme calls upon a horizontal differentiator filtering to determine the edges of the runway and in a second step upon a correlation, line by line, of the image thus filtered with the symmetric of this image (with respect to its mid-axis).

The image processing can be carried out at the image rate or indeed at a lower rate if necessary. If appropriate, this processing can furthermore comprise a Kalman filtering making it possible to perform a tracking of the landing runway, in a manner known per se.

Figure 2:
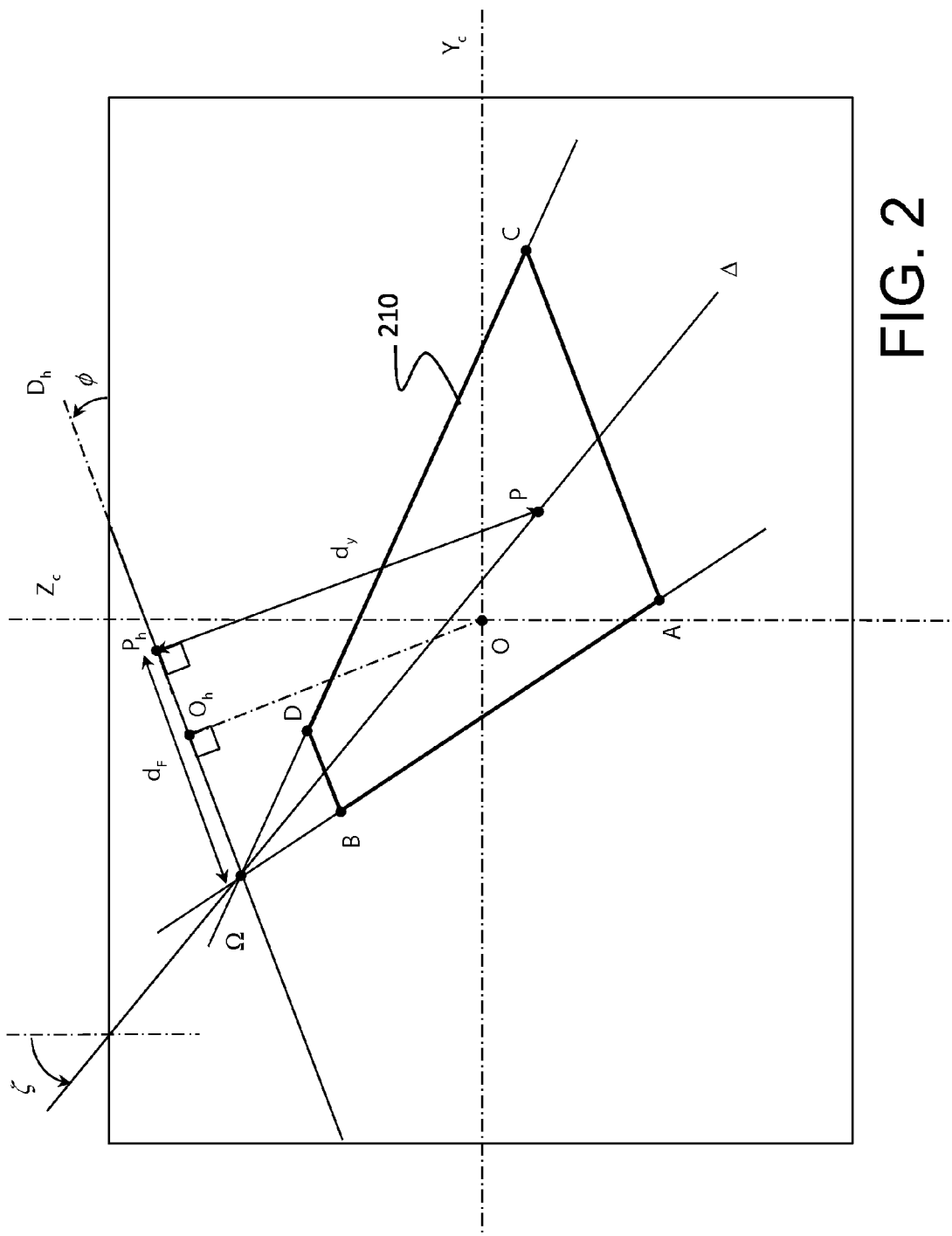
FIG. 2 represents an image of the landing runway captured by the image capture device in conjunction with the first embodiment.

In all cases, the processing makes it possible to identify the edges of the landing runway, stated otherwise the straight lines (AB) and (CD) which delimit the runway, 210, on either side of its mid-axis (Δ) as represented in FIG. 2.

The straight lines (AB) and (CD) cross at a vanishing point, Ω, belonging to the horizon line $D_h$. Stated otherwise, the point Ω is the intersection of the straight line $D_h$ and of the mid-axis Δ.

In FIG. 2, P also represents the planned point of impact of the aircraft on the landing runway (also dubbed the touchdown point). This point can be determined by the image analyzer on the basis of the rectangular marks on the runway defining the start of the touchdown zone, or else be designated manually on the image by the pilot (by a touchsensitive interface, for example).

The image analyzer furthermore determines the characteristics of the segment [P,Ω], that is to say a set of parameters making it possible to define this segment in the image. A preferred example of characteristics of this segment include:
  the angle ζ between the vertical axis and the straight line (ΩP), the distance $d_y$ of the point P from the horizon line $D_h$,
the distance $d_F$ between the orthogonal projection, $P_h$, of the point P on the horizon line and the vanishing point $\Omega$.

A person skilled in the art will understand that other characteristics could alternatively be chosen, without departing from the scope of the present disclosure. For example, it will be possible to choose instead of $\zeta$ the angle between the straight line (OP) and the horizon line $D_h$. Similarly, it will be possible to choose instead of the distances $d_y$ and $d_F$, the distance $\Omega P$ between the vanishing point and the planned point of impact. It will also be possible to choose as characteristics of the segment the coordinates of the points P and $\Omega$ in the image.

Figure 4:
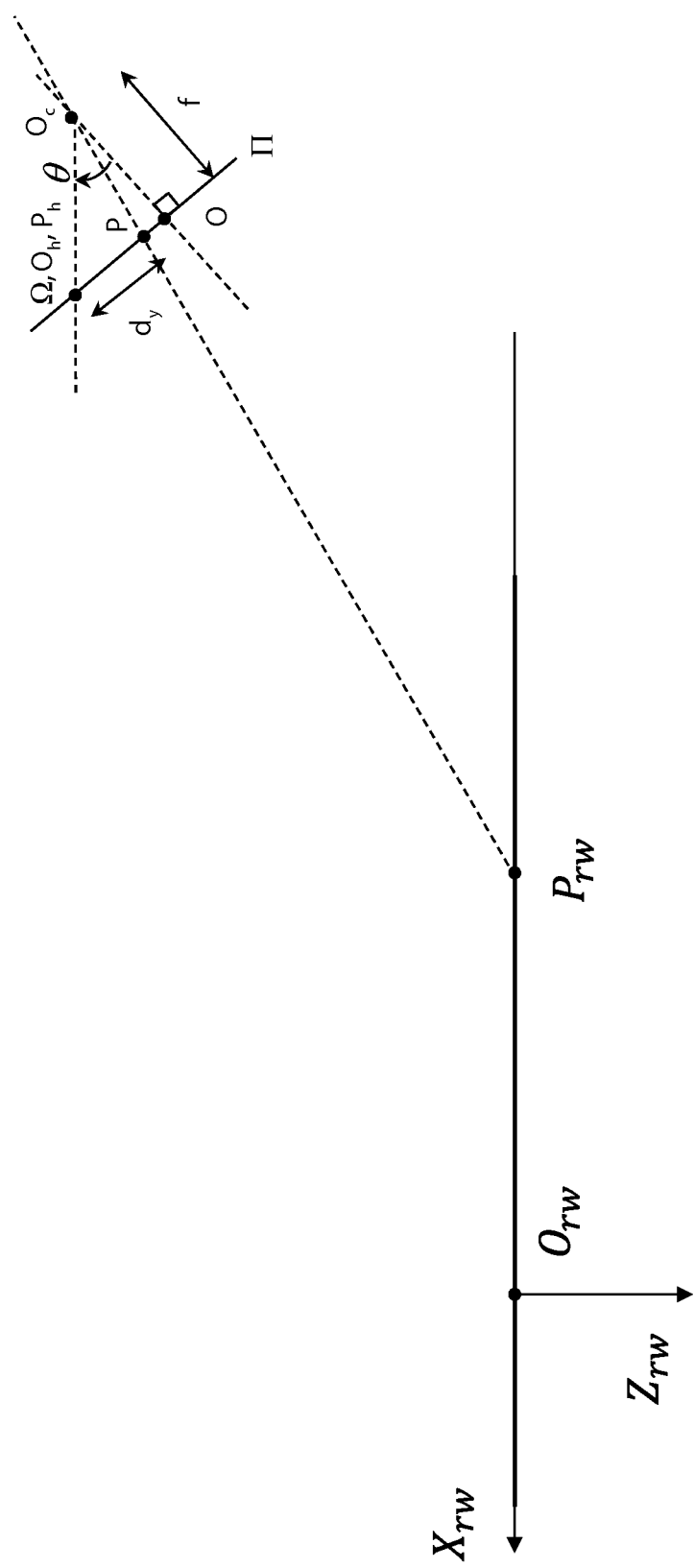
FIG. 4 illustrates, in a lateral view, the formation of an image of the landing runway in the image plane of the onboard camera.

Optionally, the image analyzer can also determine the roll angle, $\varphi$, of the aircraft as well as its pitch angle, $\theta$. Indeed, the roll angle $\phi$ can be determined as the angle between the horizon line $D_h$ and the horizontal axis of the image (cf. FIG. 2). Likewise, the pitch angle $\theta$ of the aircraft (assume $\theta_{cam}=0$) is defined by $$\theta = \arctan\left(\frac{OO_h}{f}\right)$$

where $OO_h$ is the distance from the centre O of the image to the horizon line $D_h$ and where f is the focal length of the camera (cf. FIG. 4).

Whichever variant is envisaged, the characteristics of the segment [P,$\Omega$] are thereafter provided to a measurement system or module for measurement in the inertial frame, 130. Here, a terrestrial local frame tied to the landing runway will be called an inertial frame, as represented schematically in FIG. 3.

The inertial frame $R_{rw}$ is defined by an origin $O_{rw}$ and axes, $O_{rw}X_{rw}$, $O_{rw}Y_{rw}$ and $O_{rw}Z_{rw}$ tied to the runway. Preferably, the axis $O_{rw}X_{rw}$ is chosen coincident with the longitudinal axis (or mid-axis) of the runway, the axis $O_{rw}Y_{rw}$ is the transverse axis of the runway and the axis $O_{rw}Z_{rw}$ is a vertical axis, oriented downwards, the frame $R_{rw}$ being chosen right-handed orthogonal. The vertices of the runway have been designated by $A_{rw}$, $B_{rw}$, $C_{rw}$, $D_{rw}$ and the planned point of impact on the runway by $P_{rw}$. It will be understood that the points A, B, C, D, P of the image represent, in the image plane of the camera, the points $A_{rw}$, $B_{rw}$, $C_{rw}$, $D_{rw}$, $P_{rw}$ of the runway.

Figure 3:
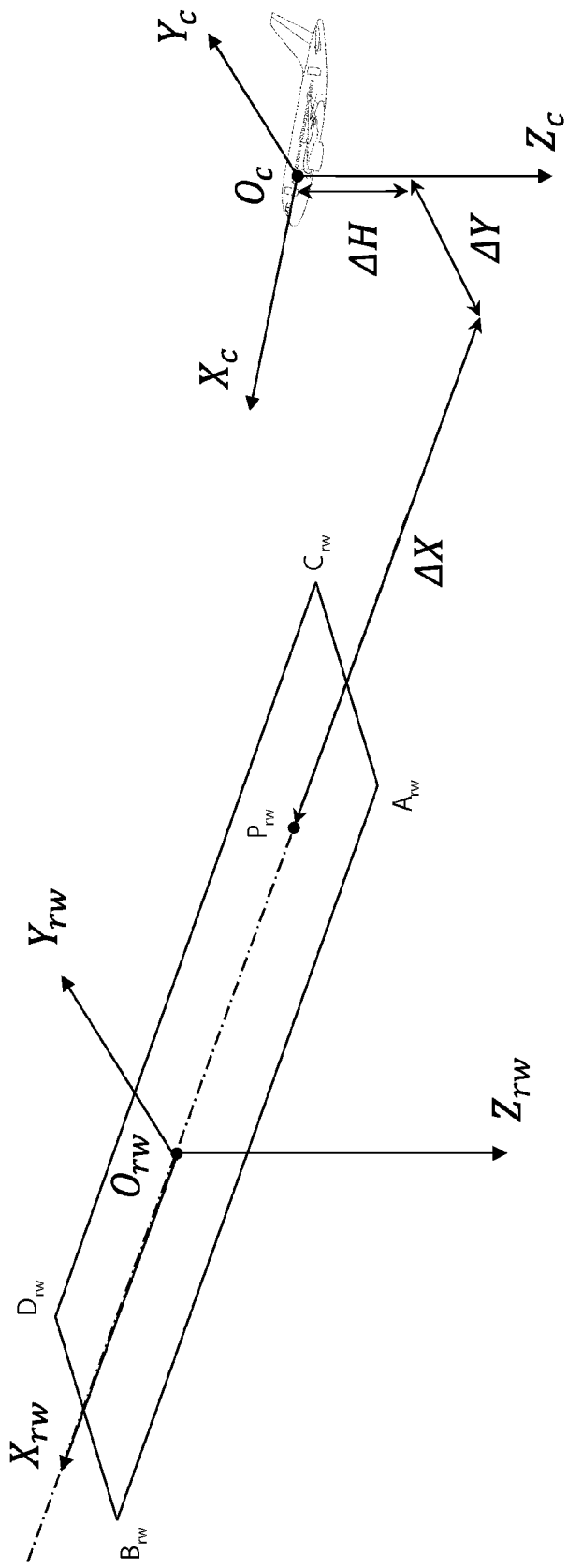
FIG. 3 represents the relative situation of the aircraft with respect to the landing runway in the inertial frame.

Represented in FIG. 3 is a frame $R_c$ tied to the camera, defined by its origin $O_c$ (optical centre of the camera in a pinhole model), and its axes $O_cX_c$, $O_cY_c$ and $O_cZ_c$. The axis $O_cX_c$ is the focal axis of the camera and it points in the direction of observation. The axes $O_cY_c$ and $O_cZ_c$ are respectively parallel to the horizontal axis and to the vertical axis of the image, the frame $R_c$ being chosen right-handed orthogonal. The frame $R_c$ is considered to be identical to the frame tied to the aircraft.

FIG. 4 shows in lateral view the formation of an image of the landing runway in the image plane $\Pi$ of the camera. Here a pinhole model has been adopted for the camera and its optical centre represented at $O_c$. It has also been assumed for simplification reasons that the longitudinal axis of the aircraft was in the symmetry plane of the runway (plane of the figure).

The vanishing point, $\Omega$ is defined by the intersection of the horizontal passing through $O_c$ with the image plane $\Pi$. The inertial frame $R_{rw}$ has also been represented in the figure.

Returning to FIG. 1, the module for measurement in the inertial frame, 130, measures a plurality of observables in this frame on the basis of the characteristics of the segment [P,$\Omega$], namely:

The first observable in the inertial frame is the heading angle $\psi$ of the aircraft with respect to the mid-axis of the landing runway.

The second observable in the inertial frame is the ratio $$\frac{\Delta X}{\Delta H}$$

where $\Delta X$ is the longitudinal deviation between the position of the aircraft and the position of the planned point of impact and $\Delta H=-\Delta V$ where $\Delta Z$ is the vertical deviation between the position of the aircraft and the position of the planned point of impact.

The third observable in the inertial frame is the ratio $$\frac{\Delta Y}{\Delta H}$$

where $\Delta Y$ is the lateral deviation between the position of the aircraft and the position of the planned point of impact and where $\Delta H$ is the vertical deviation, defined previously.

These three observables are expressed as a function of the characteristics of the segment [P,$\Omega$]. Indeed, if R denotes the rotation matrix that moves the inertial frame $R_{rw}$ into the frame of the camera:

$$R = R_\phi R_\theta R_\psi \quad (1)$$

where the matrix $R_\phi$ is the roll matrix, $R_\theta$ is the pitch matrix and $R_\psi$ is the heading matrix. The roll angle of the aircraft is denoted by $\phi$ and its pitch angle is denoted by $\theta$. The relative heading angle between the aircraft and the landing runway is denoted by $\psi$. More precisely this heading angle is that formed in the horizontal plane $O_{rw}X_{rw}Y_{rw}$ between the longitudinal axis of the runway $O_{rw}X_{rw}$ and the longitudinal axis of the aircraft.

The rotation matrix R can then be expressed in the following form:

$$R = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix} \quad (2)$$

or else:

$$R = \begin{bmatrix} \cos\psi\cos\theta & \sin\psi\sin\theta & -\sin\theta \\ \cos\phi\sin\psi + \sin\phi\cos\psi\sin\theta & \cos\phi\cos\psi + \sin\phi\sin\psi\sin\theta & \sin\phi\cos\theta \\ \sin\phi\sin\psi + \cos\phi\cos\psi\sin\theta & \cos\phi\sin\psi\sin\theta - \sin\phi\cos\psi & \cos\phi\cos\theta \end{bmatrix} \quad (3)$$

The position deviations $\Delta X$, $\Delta Y$, $\Delta Z$ between the point of impact $P_{rw}$ and the aircraft, expressed in the inertial frame, and the deviations $\Delta X_c^P$, $\Delta Y_c^P$, $\Delta Z_c^P$ expressed in the frame of the camera are linked by the vector relation:

$$\begin{bmatrix} \Delta X_c^P \\ \Delta Y_c^P \\ \Delta Z_c^P \end{bmatrix} = R \begin{bmatrix} \Delta X \\ \Delta Y \\ \Delta Z \end{bmatrix} \quad (4)$$

Moreover, the coordinates of the planned point of impact P in the image plane of the camera are given by:

$$\begin{bmatrix} x_P \\ y_P \\ z_P \end{bmatrix} = \begin{bmatrix} f \\ f \cdot \dfrac{\Delta Y_c^P}{\Delta X_c^P} \\ f \cdot \dfrac{\Delta Z_c^P}{\Delta X_c^P} \end{bmatrix} \quad (5)$$

Similarly, the position deviations, $\Delta X_c^\Omega$, $\Delta Y_c^\Omega$, $\Delta Z_c^\Omega$, between the vanishing point and the aircraft, expressed in the frame tied to the camera, are given by the vector relation:

$$\begin{bmatrix} \Delta X_c^\Omega \\ \Delta Y_c^\Omega \\ \Delta Z_c^\Omega \end{bmatrix} = R \begin{bmatrix} 1 \\ 0 \\ 0 \end{bmatrix} \quad (6)$$

given that the vanishing point is situated at infinity on the axis $O_{rw} X_{rw}$.

The coordinates of the vanishing point in the image plane of the camera are given by:

$$\begin{bmatrix} x_\Omega \\ y_\Omega \\ z_\Omega \end{bmatrix} = \begin{bmatrix} f \\ f \cdot \dfrac{\Delta Y_c^\Omega}{\Delta X_c^\Omega} \\ f \cdot \dfrac{\Delta Z_c^\Omega}{\Delta X_c^\Omega} \end{bmatrix} \quad (7)$$

The characteristics $\zeta$, $d_y$, $d_F$ of the segment [P,$\Omega$] in the image can be expressed by the coordinates of the expected point of impact and of the vanishing point in the image plane:

$$\tan\zeta = \frac{y_\Omega - y_P}{-z_\Omega + z_P} \quad (8\text{-}1)$$

$$d_y = \sin\phi \cdot (y_P - y_\Omega) + \cos\phi \cdot (z_P - z_\Omega) \quad (8\text{-}2)$$

$$d_F = \frac{y_\Omega}{\cos\phi} \quad (8\text{-}3)$$

By plugging the expressions for the coordinates $x_P$, $y_P$, $z_P$ and $x_\Omega$, $y_\Omega$, $z_\Omega$ provided by relations (4), (5) and (6), (7) into relations (8-1), (8-2), (8-3), we finally obtain:

$$\zeta = \arctan\left(\frac{(\cos\phi\cos\theta)\Delta Y + (\cos\phi\sin\psi\sin\theta - \sin\phi\cos\psi)\Delta H}{(\sin\phi\cos\theta)\Delta Y + (\sin\phi\sin\psi\sin\theta - \cos\phi\cos\psi)\Delta H}\right) \quad (9\text{-}1)$$

$$d_y = \frac{f \cdot \Delta H}{(\cos\psi\cos^2\theta)\Delta X + (\sin\psi\cos^2\theta)\Delta Y + (\cos\theta\sin\theta)\Delta H} \quad (9\text{-}2)$$

$$d_F = f\left(\frac{\tan\psi}{\cos\theta} + \tan\phi\tan\theta\right) \quad (9\text{-}3)$$

The observables in the inertial frame, $\psi$, $$\frac{\Delta X}{\Delta H} \text{ and } \frac{\Delta Y}{\Delta H}$$

are consequently deduced from the characteristics of the segment [P,$\Omega$] in the image, by the relations:

$$\psi = \arctan\left(\cos\theta \cdot \left(\frac{d_F}{f} - \tan\phi\tan\theta\right)\right) \quad (10\text{-}1)$$

$$\frac{\Delta Y}{\Delta H} = \frac{(\cos\phi\sin\psi\sin\theta - \sin\phi\cos\psi) - (\sin\phi\sin\psi\sin\theta + \cos\phi\cos\psi)\tan\zeta}{\tan\zeta\sin\phi\cos\theta - \cos\phi\cos\theta} \quad (10\text{-}2)$$

$$\frac{\Delta X}{\Delta H} = \frac{\dfrac{f}{d_y} - \left((\sin\psi\cos^2\theta)\dfrac{\Delta Y}{\Delta H} + \cos\theta\sin\theta\right)}{\cos\psi\cos^2\theta} \quad (10\text{-}3)$$

In the computation of the observables, the roll and pitch angles $\phi$, $\theta$ can be obtained by sensors onboard the aircraft or else be determined on the basis of the image as explained previously. In contradistinction to the relative heading angle, the deviations $\Delta X$, $\Delta Y$, $\Delta H$ cannot be estimated directly on the basis of the characteristics of the segment [P,$\Omega$].

If u(t) denotes the vector defined by $u(t)=(\Delta X, \Delta Y, \Delta H)^T$ where here t expresses the dependency of the vector as a function of time, $v(t)=(v_1\ v_2\ v_3)^T$ the velocity vector of the aircraft in the inertial frame such as provided, for example, by the inertial platforms of the aircraft, the following relations exist:

$$\dot{u}(t) = A(t)u(t)v(t) \quad (11\text{-}1)$$

$$r(t) = g(u(t))n(t) \quad (11\text{-}2)$$

where A(t) is a rotation matrix which generally depends on the time, g is the function which to any vector $u(t)=(\Delta X, \Delta Y, \Delta H)^T$ maps the vector $$g(u(t)) = \left(\frac{\Delta X}{\Delta H}\ \frac{\Delta Y}{\Delta H}\right)^T,$$

r(t) the vector of the previously defined third and second observables in the inertial frame and n(t) is a random noise vector, assumed Gaussian. The presence of this noise vector in relation (11-2) simply signifies that the measurement of the observables is affected by measurement noise.

Relations (11-1) and (11-2) are recognized as constituting the conventional formalism of a dynamic model comprising an evolution equation (11-1), where v(t) is the generating process, and of an observation equation (11-2). The state vector is the vector u(t) and the vector of the measured observables is the vector r(t).

The judicious choice of the state vector (deviations in position between the expected point of impact and the aircraft, expressed in the inertial frame) and of that of the observables (measured directly on the basis of the characteristics of the segment [P,$\Omega$]) leads to a particularly simple estimation of the aforementioned position deviations.

Indeed, by using a state vector directly in the inertial frame and not in the frame of the aircraft (moving with a rotation motion with respect to the inertial frame) it is possible to obtain an evolution equation of particularly simple form, since in this case A(t)=0. Consequently, the dynamic model can be described by the relations:

$$\dot{u}(t)=v(t) \quad (12\text{-}1)$$

$$r(t)=g(u(t))n(t) \quad (12\text{-}2)$$

Returning to FIG. 1, the second and third observables measured by the measurement system or module 130, stated otherwise the components of the vector, are provided to an estimation system or module 140 at each instant. This estimation system or module also receives the components of the velocity vector of the aircraft, v(t), which are provided for example by the inertial platform of the aircraft.

At each instant t the module 140 performs an estimation of the vector u(t) of the deviations in position between the aircraft and the planned point of impact. This estimation denoted û(t) is obtained in such a way as to minimize the measurement noise n(t).

For example, it will be possible to use the estimator described in the article by D. Karagiannis et al. entitled "A new solution to the problem of range identification in perspective vision systems" published in IEEE Trans. on Automatic Control, Vol. 50, No. 12, December 2005, pp. 2074-2077, namely:

$$\left(\frac{1}{\widehat{\Delta H}}\right)_{t+\Delta t} = \beta(t) + \int_{t}^{t+\Delta t} \alpha(\tau) \cdot d\tau \quad (13\text{-}1)$$

With $$\beta(t) = \frac{\lambda}{2}\left[\left(-\left(\frac{\Delta X}{\Delta H}\right)_t^2 - \left(\frac{\Delta Y}{\Delta H}\right)_t^2\right)v_3(t) + 2v_1(t)\left(\frac{\Delta X}{\Delta H}\right)_t + 2v_2(t)\left(\frac{\Delta Y}{\Delta H}\right)_t\right] \quad (13\text{-}2)$$

where λ is a predetermined constant governing the convergence of the algorithm, and:

$$\alpha(t) = -v_3(t)\left(\frac{1}{\widehat{\Delta H}}\right)_t^2 - \frac{\partial \beta}{\partial t} - \frac{\partial \beta}{\partial r}\left[\begin{pmatrix} v_1(t) - v_3(t)\left(\frac{\Delta X}{\Delta H}\right)_t \\ v_2(t) - v_3(t)\left(\frac{\Delta Y}{\Delta H}\right)_t \end{pmatrix}\left(\frac{1}{\widehat{\Delta H}}\right)_t\right] \quad (13\text{-}3)$$

where $$\frac{\partial \beta}{\partial r} = \left(\frac{\partial \beta}{\partial r_1} \frac{\partial \beta}{\partial r_2}\right)^T \text{ with } r_1 = \frac{\Delta X}{\Delta H} \text{ and } r_2 = \frac{\Delta Y}{\Delta H}.$$

In the above equations the temporal index t (or +Δt) indicates the instant at which the value is considered. It will be noted that equation (13-1) gives the update of the estimation of the inverse of the vertical deviation, Δt representing the periodicity of this update.

The estimation û(t) is thereafter deduced from the vector $$r(t) \simeq \left(\frac{\Delta X}{\Delta H}, \frac{\Delta Y}{\Delta H}\right)$$

and from the estimation of the vertical deviation, $\widehat{\Delta H}$.

It will be possible alternatively for other estimators to be used without departing from the scope of the present disclosure. For example, it will be possible to resort to the estimator described in the article by O. Dahl et al. entitled "Linear design of a nonlinear observer for perspective systems", published in Proc. of the 2005 IEEE Int'l Conference on Robotics and Automation, Barcelona, Spain, 2005, pp. 429-435.

The estimation û(t), stated otherwise the estimated deviations $\widehat{\Delta X}$, $\widehat{\Delta Y}$, $\widehat{\Delta H}$, as well as the measurement $\hat{\psi}$ are thereafter provided to a guidance computer 150. This computer computes and determines the guidance orders in such a way that the aircraft will place itself in the approach plane (generally inclined by 3% with respect to the ground) and align itself along the longitudinal axis of the runway. Generally, the set of guidance orders defines a guidance law that the aircraft must follow during the final approach. The guidance orders are expressed by the load factor setting (load factor demand) and the roll rate setting (roll rate demand). It is recalled that in aerodynamics the load factor is the ratio of the apparent weight to the real weight and that the roll rate is the derivative of the roll angle.

The load factor setting is given by:

$$Nz_c = K_z\widehat{\Delta Z} + K_{Vz}V_Z \quad (14\text{-}1)$$

where $\Delta Z = -\Delta H$, $V_Z = (\widehat{\Delta Z})'$ is the vertical speed, and $K_z$, $K_{Vz}$ are predetermined constants.

The roll rate setting is given by:

$$\dot{\varphi}_C = K_Y\widehat{\Delta Y} + K_\psi\psi + K_\phi\phi \quad (14\text{-}2)$$

where $K_Y$, $K_\psi$, and $K_\phi$ are predetermined constants and where the relative heading angle with respect to the runway, ψ, is measured on the basis of (10-1). The roll angle φ can be obtained on the basis of measurements of sensors onboard the aircraft or measured on the basis of the angle formed between the horizon line and the horizontal of the image, as explained previously.

The guidance orders are thereafter transmitted to a flight controls computer, 160. The latter then determines the controls to be applied to the actuators of the control surfaces so as to satisfy the guidance orders. The automatic piloting system can in particular use a law C* for the longitudinal control and a law Y* for the transverse control, in a manner known per se.

Thus, the law C* controls the elevators by:

$$DQ = +K_1q + K_2n_z + K_3\int(n_z - Nz_c)dt + K_4Nz_c \quad (15\text{-}1)$$

where DQ is the control for the control surface actuator, $Nz_c$ is the previously computed load factor setting, $n_z$ is the instantaneous load factor, q is the pitch rate and $K_1, \ldots, K_4$ are predetermined constants.

Similarly, the law Y* controls the ailerons and the fins, respectively by:

$$DP = k_{12}P + k_{13}r + k_{14}\varphi + k_{15}\beta + k_{16}\dot{\varphi}_c \quad (15\text{-}2)$$

$$DR = k_{21}p + k_{22}r + k_{23}\varphi + k_{24}\beta + k_{25}\dot{\varphi}_c \quad (15\text{-}3)$$

where DP and DR are respectively the control for the ailerons and for the fin, φ is the roll angle, p is the roll rate (where p=φ̇ r-tan(θ) with r yaw rate and θ pitch angle), q is the pitch rate, β is the sideslip angle and the coefficients $k_{ij}$ are predetermined constants. A detailed description of the aforementioned control laws may be found in the article by Farineau entitled "Lateral electric flight control laws of the A320 based upon eigenstructure assignment techniques" published in Proceedings of the AIAA GNC Conference, 2004.

In its simplest form, the automatic landing system according to the disclosure herein does not comprise the flight controls computer 160 (represented dashed), the latter possibly simply being the existing EFC (Electric Flight Controls) system on the aircraft. A retrofit of the aircraft can therefore readily be performed without having to modify the EFC system.

Figure 5:
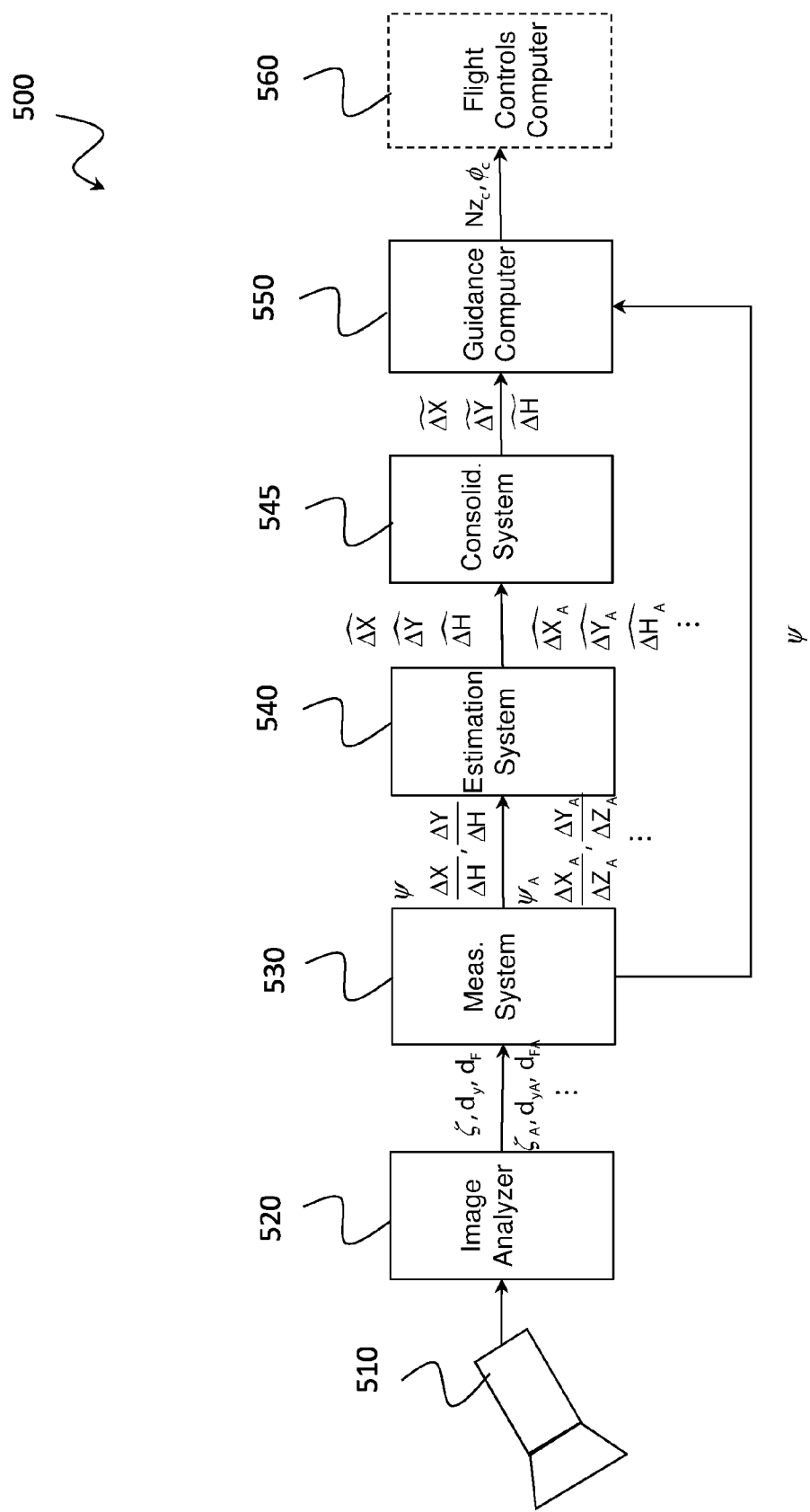
FIG. 5 represents in a schematic manner an automatic landing system according to a second embodiment of the disclosure herein.

FIG. 5 represents in a schematic manner an automatic landing system, 500, according to a second embodiment of the disclosure herein.

This embodiment differs from the first in that in addition to performing an estimation of the deviations in position between the aircraft and the planned point of impact $P_{rw}$, one also estimates all or part of the deviations in position between the aircraft and the various "corners" of the runway (that is to say the vertices of the rectangle representing the runway) and, more precisely:

the position deviations $\Delta X_A$, $\Delta Y_A$, $\Delta Z_A$ between the aircraft and the left proximal vertex $A_{rw}$;

the position deviations $\Delta X_B$, $\Delta Y_B$, $\Delta Z_B$ between the aircraft and the left distal vertex, $B_{rw}$;

the position deviations $\Delta X_C$, $\Delta Y_C$, $\Delta Z_C$ between the aircraft and the right proximal vertex, $C_{rw}$;

the position deviations $\Delta X_D$, $\Delta Y_D$, $\Delta Z_D$ between the aircraft and the right distal vertex, $D_{rw}$.

The automatic landing system according to the second embodiment of the disclosure herein comprises, as in the first embodiment, an image capture system, 510, identical to the system 110 described previously, image analyzer, 520, a measurement system or module 530, suitable for measuring observables in the inertial frame, an estimator, which can be an estimation system or module 540, for estimating, in addition to the position deviations, $\Delta X$, $\Delta Y$, $\Delta H$, of the first embodiment, all or part of the deviations in position between the various vertices of the runway and of the aircraft.

The set of position deviations thus estimated is thereafter provided to a consolidation system or module, 545 which fuses the position deviations thus estimated to obtain consolidated position deviations, $\widetilde{\Delta X}, \widetilde{\Delta Y}, \widetilde{\Delta H}$ between the planned point of impact and the aircraft.

Moreover, the estimation module 540 can furthermore determine on the basis of the various estimated position deviations, the length and/or the slope of the runway, so as to adapt for example the braking power of the aircraft when it is in contact with the ground (estimation of runway length) or to modify the flare of the trajectory (estimation of the slope).

The image analyzer, 520, first performs a detection of the landing runway, as previously. The image analyzer can also determine the characteristics of the segments [A,Ω], [B,Ω], [C,Ω], [D,Ω], in addition to those of the segment [P,Ω]. It is recalled that the characteristics of a segment are a set of parameters making it possible to define this segment in the image.

Figure 6:
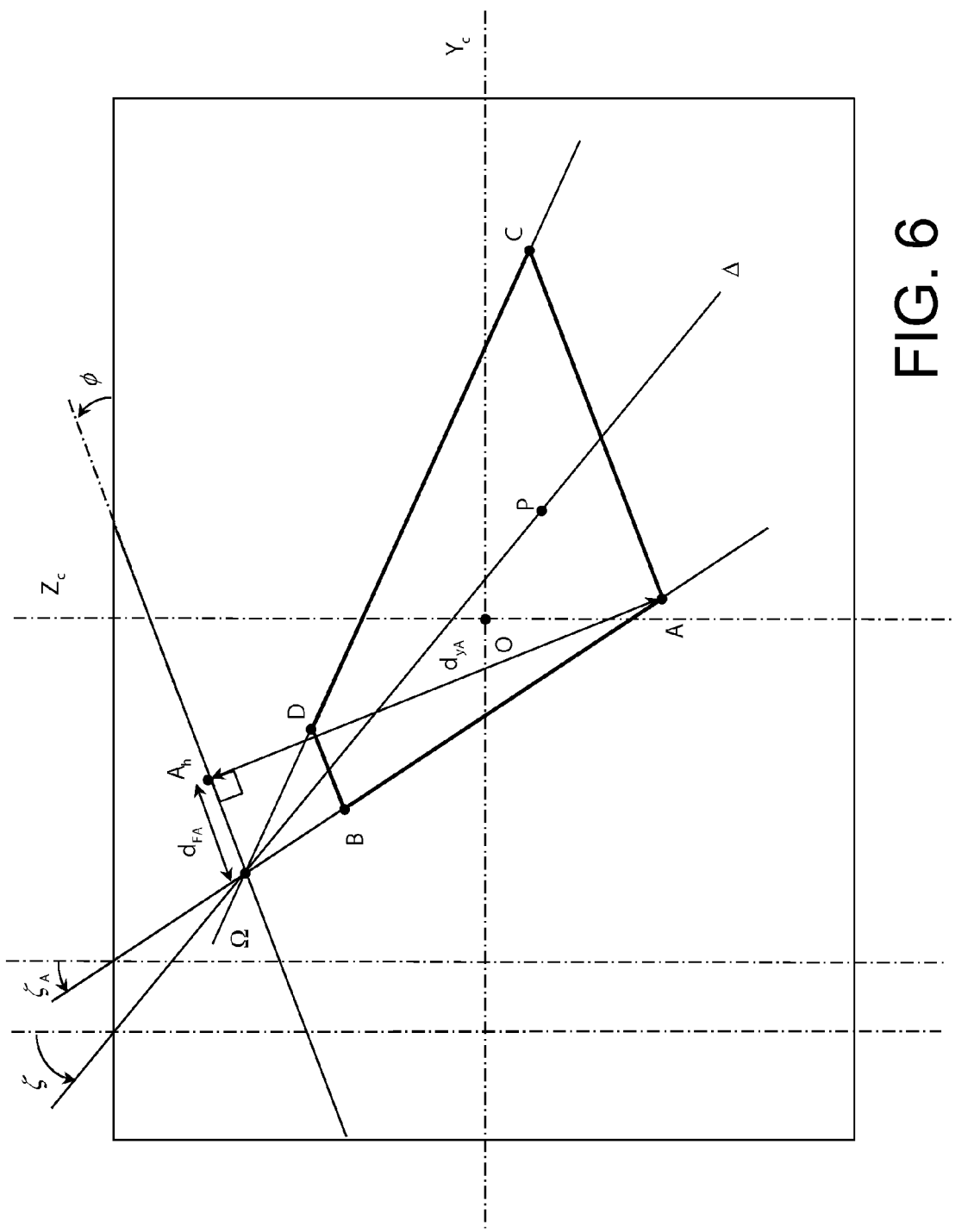
FIG. 6 represents an image of the landing runway captured by the image capture device in conjunction with the second embodiment.

FIG. 6 represents an image captured by the image system 510 as well as an example of characteristics of the segment [A,Ω], namely:

the angle $\zeta_A$ between the vertical axis and the straight line (ΩA), the distance $d_{\nu A}$ of the point A from the horizon line $D_h$, the distance $d_{FA}$ between the orthogonal projection, $A_h$, of the point A on the horizon line and the vanishing point Ω.

It will be understood that similar characteristics can be determined for the other vertices B, C, D of the runway.

The measurement module 530 measures not only the observables ψ, $$\frac{\Delta X}{\Delta H}, \frac{\Delta Y}{\Delta H}$$

like the module 130, but also the corresponding observables, relating to the various vertices of the runway, for example the observables $\psi_A$, $$\frac{\Delta X_A}{\Delta Z_A}, \frac{\Delta Y_A}{\Delta Z_A}$$

relating to the point A, where the angle $\psi_A$ is the relative heading of the aircraft with respect to the straight line (AΩ).

Here again, the estimation module 540 estimates not only the position deviations $\Delta X$, $\Delta Y$, $\Delta H$ as in the first embodiment, but also the position deviations relating to the various vertices of the runway, for example the position deviations $\Delta X_A$, $\Delta Y_A$, $\Delta Z_A$. The estimation is obtained according to the same principle as that of relations (12-1), (12-2) and (13).

In contradistinction to the first embodiment, the second embodiment comprises a consolidator, which can be a consolidation system or module 545, which fuses the estimations of the deviations, $\widehat{\Delta X}$, $\widehat{\Delta Y}$, $\widehat{\Delta H}$ with the estimations of the deviations obtained for the various vertices of the runway, for example the position deviations $\widehat{\Delta X}_A$, $\widehat{\Delta Y}_A$, $\widehat{\Delta Z}_A$ relating to the point $A_{rw}$, the deviations $\widehat{\Delta X}_B$, $\widehat{\Delta Y}_B$, $\widehat{\Delta Z}_B$ relating to the point $B_{rw}$, etc.

The estimated deviations relating to the various vertices can be consolidated with those relating to the planned point of impact so as to obtain consolidated estimations of deviations. For example, the estimation $\widetilde{\Delta Y}$ of the lateral deviation of the position of the aircraft with respect to the point of impact can be consolidated with the estimations of the lateral deviations $\widehat{\Delta Y}_A$ and $\widehat{\Delta Y}_C$ of the position of the aircraft with respect to the vertices $A_{rw}$ and $C_{rw}$:

$$\widetilde{\Delta Y} = \widehat{\Delta Y} + \frac{\widehat{\Delta Y_A} + \widehat{\Delta Y_C}}{2} \tag{16}$$

Similarly, the estimation $\widetilde{\Delta X}$ of the longitudinal deviation of the position of the aircraft with respect to the point of impact can be consolidated with the estimations of the longitudinal deviations $\widehat{\Delta X}_A$ and $\widehat{\Delta X}_C$:

$$\widetilde{\Delta X} = \widehat{\Delta X} + \frac{\widehat{\Delta X_A} + \widehat{\Delta X_C}}{2} + \delta \tag{17}$$

where δ is the normalized distance of the planned point of impact from the runway threshold defined by the segment $[A_{rw}, C_{rw}]$.

Other forms of consolidation may be envisaged by the person skilled in the art without departing from the scope of the present disclosure. In any event, the estimations thus consolidated $\widetilde{\Delta X}$, $\widetilde{\Delta Y}$, $\widetilde{\Delta H}$ exhibit greater robustness and better tracking stability than the initial estimations $\widehat{\Delta X}$, $\widehat{\Delta Y}$, $\widehat{\Delta H}$. In particular, this consolidation makes it possible to improve the observability of the initial estimations $\widehat{\Delta X}, \widehat{\Delta Y}, \widehat{\Delta H}$ when the aeroplane is aligned with the axis of the landing runway and stable in the approach plane.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for automatic landing of an aircraft on a landing runway, comprising:
   an onboard image capture system carried by the aircraft and intended to capture a series of successive images of the ground;
   an image analyzer for detecting in an image a landing runway and for determining in this image the characteristics of a segment [P,Ω] connecting a planned point of impact P on the runway and a vanishing point Ω of the image;
   a measurement module for measuring a plurality of observables in an inertial frame tied to the runway, on the basis of the characteristics of the segment [P,Ω], the plurality of observables comprising a first observable defined by the relative heading angle (ψ) of the aircraft with respect to a mid-axis of the runway, a second observable $$\left(\frac{\Delta Y}{\Delta H}\right)$$

defined by the ratio of a lateral deviation to a vertical deviation of the position of the aircraft with respect to the point of impact and a third observable $$\left(\frac{\Delta X}{\Delta H}\right)$$

defined by the ratio of a longitudinal deviation to the vertical deviation of the position of the aircraft with respect to the point of impact;
   an estimator for estimating longitudinal (ΔX), lateral (ΔY) and vertical (ΔH) position deviations, expressed in the inertial frame, of the position of the aircraft with respect to the point of impact on the basis of the measurements of the first, second and third observables; and
   a guidance module for determining guidance orders for the aircraft on the basis of the longitudinal, lateral and vertical position deviations thus estimated, and of the relative heading angle,
   wherein characteristics of the segment [P,Ω] in the image are the angle ζ between the straight line (PΩ) with the vertical of the image, the distance $d_y$ of the point P from a horizon line $D_h$ and the distance $d_F$ between the orthogonal projection, $P_h$, of the point P on the horizon line and the vanishing point Ω.

2. The automatic landing system according to claim 1, wherein the image capture system comprises an onboard camera and that the relative heading angle ψ is measured in the image by the measurement system by the relation:

$$\psi = \arctan\left(\cos\theta \cdot \left(\frac{d_F}{f} - \tan\phi\tan\theta\right)\right)$$

where f is the focal length of the onboard camera, φ is a roll angle and θ is the pitch angle of the aircraft.

3. The automatic landing system according to claim 2, wherein the second observable is measured in the image by the measurement module by:

$$\frac{\Delta Y}{\Delta H} = \frac{(\cos\phi\sin\psi\sin\theta - \sin\phi\cos\psi) - (\sin\phi\sin\psi\sin\theta + \cos\phi\cos\psi)\tan\zeta}{\tan\zeta\sin\phi\cos\theta - \cos\phi\cos\theta}.$$

4. The automatic landing system according to claim 3, wherein the third observable is measured in the image by the measurement module by:

$$\frac{\Delta X}{\Delta H} = \frac{\frac{f}{d_y} - \left((\sin\psi\cos^2\theta)\frac{\Delta Y}{\Delta H} + \cos\theta\sin\theta\right)}{\cos\psi\cos^2\theta}.$$

5. The automatic landing system according to claim 4, wherein the longitudinal, lateral and vertical position deviations of the position of the aircraft with respect to the point of impact are estimated by the estimator by a dynamic model using as state equation u̇(t)=v(t), where u(t)=(ΔX, ΔY, ΔH)$^T$ is a vector comprising the longitudinal, lateral and vertical position deviations at the instant t, v(t) is the velocity vector of the aircraft in an inertial frame, and as observation equation r(t)=g(u(t))+n(t), where r(t) is the vector of the third and second observables, and g is the function which to any vector u(t)=(ΔX, ΔY, ΔH)$^T$ maps the vector $$g(u(t)) = \left(\frac{\Delta X}{\Delta H} \quad \frac{\Delta Y}{\Delta H}\right)^T,$$

n(t) is a measurement noise vector.

6. The automatic landing system according to claim 1, wherein the aircraft guidance orders comprise a load factor setting and a roll rate setting, the guidance determining the load factor setting through the relation:

$$Nz_c = K_z \widehat{\Delta Z} + K_{Vz} V_z$$

where $\Delta Z = -\Delta H$, $V_z = (\widehat{\Delta Z})'$ is the vertical speed, and $K_z$, $K_{Vz}$ predetermined constants, and the roll rate setting through:

$$\dot{\phi}_c = K_Y \widehat{\Delta Y} + K_\psi \psi + K_\phi \phi$$

where $K_Y$, $K_\psi$, and $K_\phi$ are predetermined constants.

7. The automatic landing system according to claim 1, furthermore comprising a flight controls computer suitable for determining controls to be applied to the actuators of the control surfaces of the aircraft so as to satisfy the guidance orders.

8. The automatic landing system according to claim 1, wherein the image analyzer furthermore determines the characteristics of at least one segment ($[A,\Omega]$) from among the plurality of segments each connecting a vertex of the runway to the vanishing point $\Omega$, the measurement module measures a plurality of additional observables in an inertial frame tied to the runway on the basis of the characteristics of the at least one segment, the plurality of additional observables comprising a first additional observable defined by the relative heading angle ($\psi_A$) of the aircraft with respect to a straight line passing through the vertex of the runway and the vanishing point, a second additional observable $$\left(\frac{\Delta Y_A}{\Delta Z_A}\right)$$

defined by a ratio of a lateral deviation to a vertical deviation of the position of the aircraft with respect to the vertex and a third additional observable $$\left(\frac{\Delta X_A}{\Delta Z_A}\right)$$

defined by a ratio of a longitudinal deviation to the vertical deviation of the position of the aircraft with respect to the vertex, the estimator estimates additional longitudinal ($\Delta X_A$), lateral ($\Delta Y_A$) and vertical ($\Delta Z_A$) position deviations, expressed in the inertial frame, of the position of the aircraft with respect to the vertex of the runway on the basis of the measurements of the first, second and third additional observables, the automatic landing system furthermore comprising a consolidator for fusing the estimations of the longitudinal, lateral and vertical position deviations with the estimations of the additional longitudinal, lateral and vertical position deviations with respect to the vertex of the runway and providing consolidated longitudinal, lateral and vertical deviations in position between the aircraft and the planned point of impact.

9. The automatic landing system according to claim 8, wherein the guidance determines the aircraft guidance orders on a basis of the longitudinal, lateral and vertical position deviation estimations after they have been fused with the additional longitudinal, lateral and vertical position deviations.

10. The automatic landing system according to claim 8, wherein the estimator also provides on a basis of the estimations of the additional longitudinal, lateral and vertical position deviations, an estimation of the length and/or of the slope of the landing runway.

11. A method of automatic landing of an aircraft on a landing runway, comprising:
   capturing a series of successive images of the ground;
   using an image analyzer for detecting in an image presence of a landing runway and for determining in the image characteristics of a segment [P,$\Omega$] connecting a planned point of impact P on the runway and a vanishing point $\Omega$ of the image;
   measuring a plurality of observables in an inertial frame tied to the runway on a basis of the image characteristics of the segment [P,$\Omega$], the plurality of observables comprising a first observable defined by relative heading angle ($\psi$) of the aircraft with respect to a mid-axis of the runway, a second observable $$\left(\frac{\Delta Y}{\Delta H}\right)$$

defined by a ratio of a lateral deviation of position of the aircraft with respect to the point of impact and a third observable $$\left(\frac{\Delta X}{\Delta H}\right)$$

defined by a ratio of a longitudinal deviation to a vertical ratio of position of the aircraft with respect to the point of impact;
   estimating longitudinal ($\Delta X$), lateral ($\Delta Y$) and vertical ($\Delta H$) position deviations, expressed in the inertial frame, of the position of the aircraft with respect to the point of impact on a basis of the measurements of the first, second and third observables; and
   determining guidance orders for the aircraft on a basis of the longitudinal, lateral and vertical position deviations thus estimated, and of the relative heading angle,
   wherein characteristics of the segment [P,$\Omega$] in the image are the angle $\zeta$ between the straight line (P$\Omega$) with the vertical of the image, the distance $d_y$ of the point P from a horizon line $D_h$ and the distance $d_F$ between the orthogonal projection, $P_h$, of the point P on the horizon line and the vanishing point $\Omega$.

* * * * *